Patented May 20, 1952

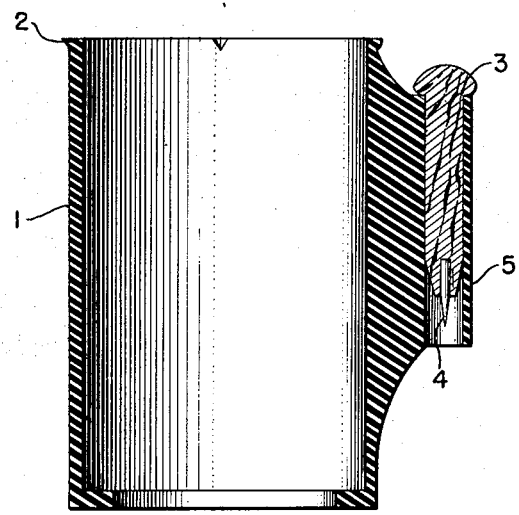
FIG.I.
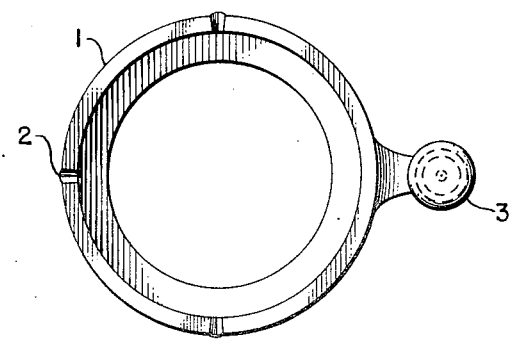
FIG.2.

2,597,295

UNITED STATES PATENT OFFICE 2,597,295

MILK CAN HOLDER

James F. Connor, Cleveland, Ohio

Application April 28, 1950, Serial No. 158,744

1 Claim. (Cl. 222—192)

My invention relates to an improvement in means for holding and puncturing condensed milk cans.

The primary object of this invention is to provide a device in the form of a combination of a milk can holder and a punch for puncturing condensed milk cans for the purpose of emptying the contents of same.

Another object of the invention is the provision of a device of the character described in which the holder affords a convenient means for holding a milk can and a receptacle for such punch so that the punch will always be conveniently at hand for the purpose of puncturing such condensed milk can.

A further object of the invention is to provide a device as described that is adapted for similar use relative to cans containing liquids other than condensed milk.

The foregoing and other objects attainable in the use of the invention will be readily understood from a reading of the description and a reference to the accompanying drawings, in which:

Fig. 1 is a cross-sectional view in elevation of the invention.

Fig. 2 is a top view of the device.

Describing the drawings: 1 is the holder part of the device with the small openings 2 which engage with the puncture in a milk can to provide an outlet for the contents of such can; there may be one or more of such openings in the holder; 3 is a punch, preferably of wood with the metal point 4, and as shown within the receptacle formed for holding it within the handle portion 5 of the device.

From the description and drawings the device will be understood to comprise a holder body of a moulded resilient material in cylindrical form and adapted to receive and inclose a condensed milk can or a similar liquid container. The holder or body of the device is provided with one or more somewhat arcuate or V-shaped depressions in the upper edge or rim, one of such depressions being positioned opposite to the handle portion of the holder or body. Such depression will indicate the point at which the can is to be punctured, making it easier to wipe off any drops of milk or other liquid which may remain on the edge of the can, also to prevent, to some extent the seepage of such drop, or drops, down between the cans on the holder wall. The purpose of providing such receptacles is to always have the punch convenient for use and a sure and safe place to keep the punch when not in use.

The holder is preferably moulded of a resilient material with all parts integral and the handle hollow to provide a receptacle for the punch as described; other desirable and suitable material may be used, other than the resilient material, and may be of any desired or required size for the uses intended.

The holder provides a convenient means for holding such a can, as described, in a safe and sanitary manner for puncturing same and while the contents are being used.

I have shown my invention in a much desired kind of material and design. However, it may be found necessary to modify the design without departing from the basic features or spirit of the invention.

What I claim is:

A holder for a milk can comprising a hollow cylindrical body having a shoulder at the bottom thereof for receiving a milk can, said body having a length substantially equal to that of the can and having a substantially smooth exterior from top to bottom except for a handle, and said body having a notch on the upper edge thereof positioned diametrically opposite the handle, said notch being adapted to serve as a pouring spout for milk from a can which is adapted to be positioned within the holder, and said handle having an opening therein adapted to receive a milk-can punch.

JAMES F. CONNOR.

REFERENCES CITED

The following references are of record in the file of this patent:

UNITED STATES PATENTS

| Number | Name | Date |
|---|---|---|
| 1,366,714 | Burkett | Jan. 25, 1921 |
| 2,217,563 | Sartan | Oct. 8, 1940 |
| 2,260,875 | Vranichar | Oct. 28, 1941 |